United States Patent
Sada et al.

(10) Patent No.: US 11,881,354 B2
(45) Date of Patent: Jan. 23, 2024

(54) LAMINATED CERAMIC ELECTRONIC COMPONENT

(71) Applicant: KYOCERA Corporation, Kyoto (JP)

(72) Inventors: Takao Sada, State College, PA (US); Yoshihiro Fujioka, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 185 days.

(21) Appl. No.: 17/427,941

(22) PCT Filed: Feb. 14, 2020

(86) PCT No.: PCT/JP2020/005686
§ 371 (c)(1),
(2) Date: Aug. 3, 2021

(87) PCT Pub. No.: WO2020/175168
PCT Pub. Date: Sep. 3, 2020

(65) Prior Publication Data
US 2022/0093330 A1    Mar. 24, 2022

(30) Foreign Application Priority Data
Feb. 27, 2019  (JP) ................................. 2019-034412

(51) Int. Cl.
*H01G 4/008*      (2006.01)
*H01G 4/248*      (2006.01)
*H01G 4/30*       (2006.01)

(52) U.S. Cl.
CPC ............. *H01G 4/008* (2013.01); *H01G 4/248* (2013.01); *H01G 4/30* (2013.01)

(58) Field of Classification Search
CPC ........ H01G 4/248; H01G 4/005; H01G 4/008; H01G 4/30; H01G 4/232
USPC .................. 361/303, 321.1, 301.4, 321.3
See application file for complete search history.

(56) References Cited

U.S. PATENT DOCUMENTS

| | | | |
|---|---|---|---|
| 2001/0055192 A1* | 12/2001 | Nakano | H01G 4/30 361/306.3 |
| 2012/0327558 A1* | 12/2012 | Jeong | B82Y 30/00 977/788 |
| 2013/0038980 A1* | 2/2013 | Kim | H01G 4/30 361/301.4 |
| 2013/0038982 A1* | 2/2013 | Lee | H01G 4/005 427/79 |
| 2013/0045385 A1 | 2/2013 | Kim et al. | |
| 2013/0063865 A1* | 3/2013 | Park | H01G 4/12 252/514 |
| 2014/0240898 A1* | 8/2014 | Kim | H01G 4/012 156/89.12 |
| 2018/0068790 A1 | 3/2018 | Chigira | |

(Continued)

FOREIGN PATENT DOCUMENTS

| | | |
|---|---|---|
| JP | 2094618 A | 4/1990 |
| JP | 2002-326868 A | 11/2002 |
| JP | 4552260 B2 | 9/2010 |

(Continued)

*Primary Examiner* — Arun Ramaswamy
(74) *Attorney, Agent, or Firm* — Volpe Koenig

(57) ABSTRACT

A laminated ceramic electronic component according to the present disclosure includes a laminated body in which ceramic layers and electrode layers are alternately laminated, at least one of the electrode layers including a first electrode portion containing a conductive carbon material.

9 Claims, 3 Drawing Sheets

(56) References Cited

U.S. PATENT DOCUMENTS

2018/0144863 A1\* 5/2018 Kim .................. C01B 32/23
2019/0304696 A1\* 10/2019 Kim .................. H01G 4/12

FOREIGN PATENT DOCUMENTS

| JP | 2013-040403 A | 2/2013 |
| JP | 2015-088550 A | 5/2015 |
| JP | 2018-041814 A | 3/2018 |

\* cited by examiner

LAMINATED CERAMIC ELECTRONIC COMPONENT

TECHNICAL FIELD

The present disclosure relates to a laminated ceramic electronic component.

BACKGROUND ART

Laminated-type ceramic electronic components manufactured in a manner such that ceramic layers and electrode layers are alternately laminated and then integrally fired have been widely known (for example, Patent Document 1).

CITATION LIST

Patent Literature

Patent Document 1: JP 2015-88550 A

SUMMARY

A laminated ceramic electronic component according to the present disclosure includes a laminated body in which ceramic layers and electrode layers are alternately laminated, at least one of the electrode layers including a first electrode portion containing a conductive carbon material.

DESCRIPTION OF EMBODIMENTS

Figure 1:
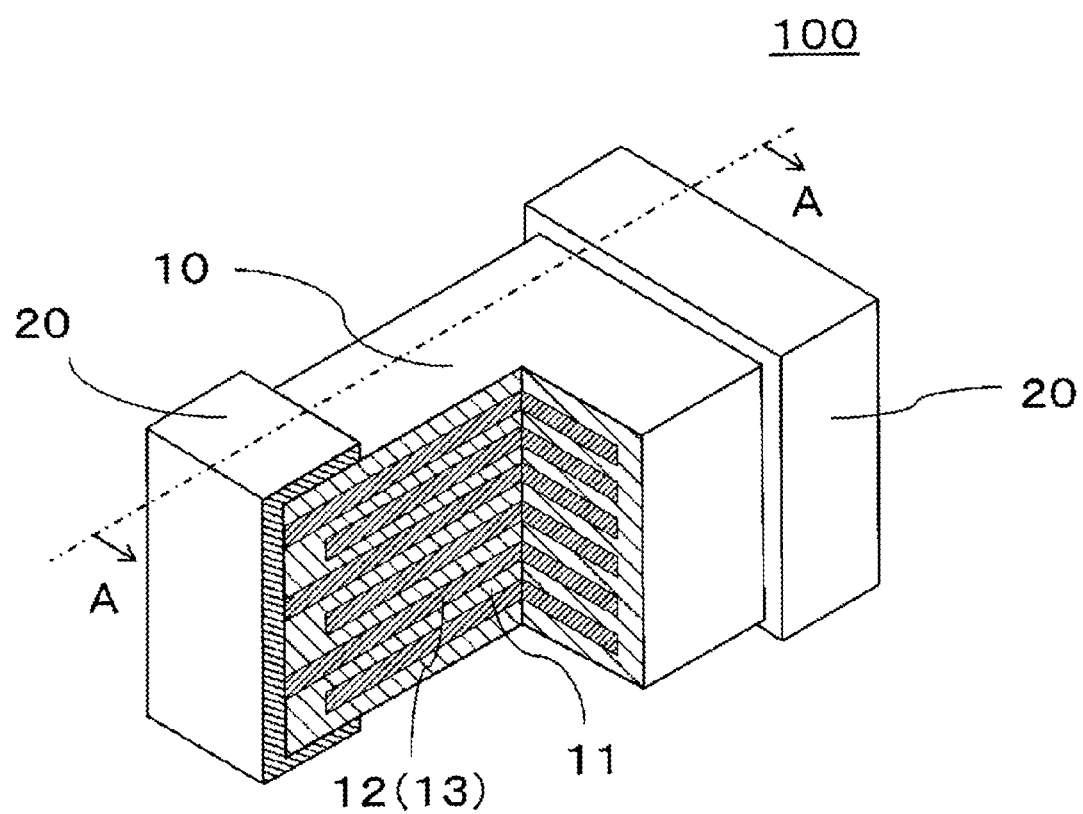
FIG. 1 is a partial cross-sectional perspective view of a laminated ceramic electronic component according to an embodiment of the present disclosure.
Figure 2:
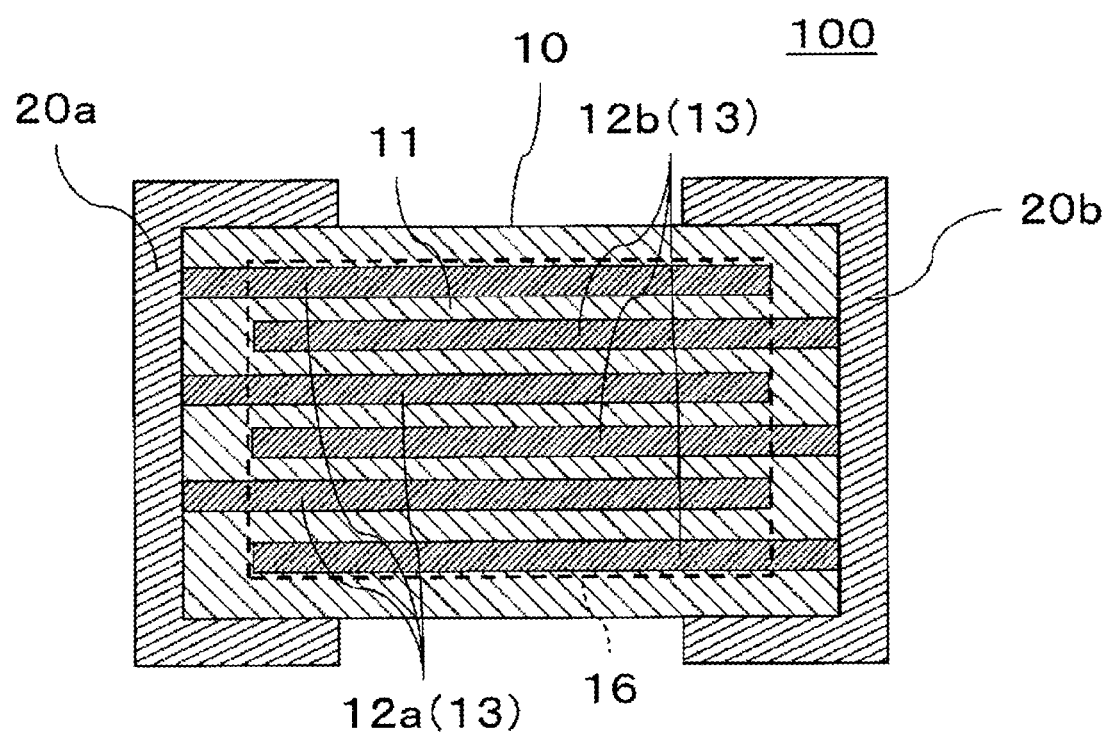
FIG. 2 is a cross-sectional view taken along a line A-A illustrated in FIG. 1.
Figure 3:
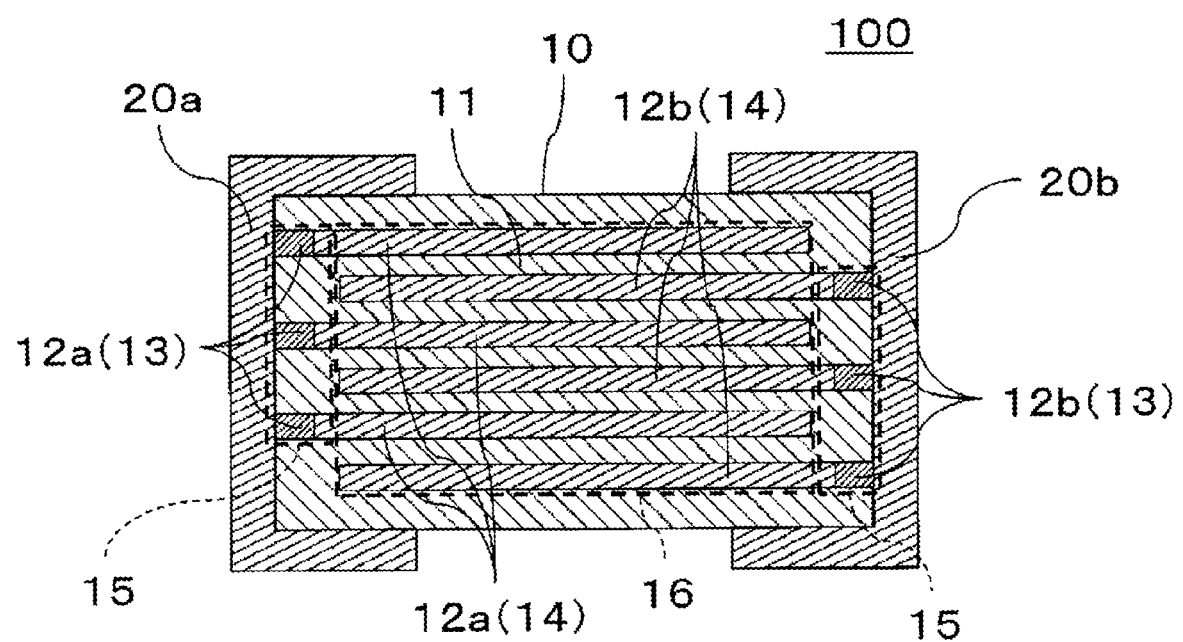
FIG. 3 is a cross-sectional view of a laminated ceramic electronic component according to another embodiment of the present disclosure.

FIG. 1 is a partial cross-sectional perspective view of a laminated ceramic electronic component 100 according to an embodiment of the present disclosure. FIG. 2 is a cross-sectional view taken along a line A-A illustrated in FIG. 1. FIG. 3 is a cross-sectional view of a laminated ceramic electronic component 100 according to another embodiment of the present disclosure.

The laminated ceramic electronic component 100 according to the embodiment is applicable to various electronic components such as multilayer ceramic capacitors, laminate piezoelectric elements, laminated thermistor elements, laminated chip coils, and ceramic multilayer substrates. As exemplified in FIG. 1 and the like, the laminated ceramic electronic component 100 includes a laminated body 10, in which ceramic layers 11 and electrode layers 12 are alternately laminated. In FIG. 1 and the like, the laminated body 10 having a rectangular parallelepiped shape is exemplified, but the laminated body 10 is not limited to such shape. For example, each surface of the laminated body 10 may be curved and the laminated body 10 may have a rounded shape as a whole. Dimensions thereof are also not particularly limited, and appropriate dimensions may be selected depending on the applications. The number of laminated layers of the ceramic layers 11 and the electrode layers 12 is not particularly limited, and may be 20 layers or more.

The ceramic layer 11 contains a ceramic material such as barium titanate ($BaTiO_3$), calcium zirconate ($CaZrO_3$), calcium titanate ($CaTiO_3$), or strontium titanate ($SrTiO_3$), as a main component. The main component refers to a compound having the highest content rate (mol %) in the ceramic layer 11. The main component of the ceramic layer 11 is not limited to the ceramic material described above.

A high dielectric constant material may be used as the main component of the ceramic layer 11 in order to increase the electrostatic capacitance of the laminated ceramic electronic component 100. As an example of the high dielectric constant material, a perovskite-type oxide containing the above-discussed ceramic material may be used. The ceramic layer 11 may contain various constituents such as Si, Mg, and rare earth elements in addition to the constituents described above. The composition of the ceramic layer 11 can be analyzed by grinding the laminated ceramic electronic component 100 and using an X-ray diffraction method (XRD) for the powdered ceramic layer 11. The thickness of the ceramic layer 11 is not particularly limited, and may be approximately 0.5 µm to 100 µm per layer.

The electrode layer 12 contains at least one type of conductive material. Various metal materials may be used as the conductive material. For example, a base metal such as nickel (Ni), copper (Cu) or tin (Sn), a noble metal such as platinum (Pt), palladium (Pd), silver (Ag) or gold (Au), or an alloy including these metals may be used as the metal material. The electrode layer 12 may contain two or more types of conductive materials. The electrode layer 12 may have a configuration in which two or more electrode portions containing different conductive materials are combined. The thickness of the electrode layer 12 may be appropriately determined depending on the application and the like, and may be approximately from 0.1 µm to 100 µm.

The laminated ceramic electronic component 100 may include a first external electrode and a second external electrode 20, to which the electrode layers 12 are electrically connected alternately, at end portions of the laminated body 10. More specifically, as illustrated in FIG. 2, the laminated ceramic electronic component 100 may have a configuration in which an electrode layer 12a electrically connected to the first external electrode 20a and an electrode layer 12b electrically connected to the second external electrode 20b are alternately laminated with the ceramic layer 11 interposed therebetween. The laminated ceramic electronic component 100 may include two or more pairs of external electrodes 20. The external electrodes included in the laminated ceramic electronic component 100 are not limited to the above-described ones, and external electrodes having different connection states with the electrode layers 12 may be included therein.

Various metal materials may be used for the external electrodes 20. For example, a base metal such as nickel (Ni), copper (Cu) or tin (Sn), a noble metal such as platinum (Pt), palladium (Pd), silver (Ag) or gold (Au), or an alloy including these metals may be used as the metal material.

When the laminated ceramic electronic component 100 is used while being mounted on a wiring substrate, a short circuit may occur between the electrode layers 12 due to a thermal stress while being mounted on the substrate, mechanical stress caused by the deflection of the substrate after being mounted on the substrate, thermal runaway in a high temperature loading environment, or the like. An overcurrent flows in the laminated ceramic electronic component 100, in which the short circuit has occurred, and there arises a possibility of fuming, firing, or the like. The laminated ceramic electronic component 100, in which the short circuit has occurred, loses its function in many cases.

To deal with this, as illustrated in FIG. 1 and the like, in the laminated ceramic electronic component 100 according to the embodiment, at least one electrode layer 12 includes a first electrode portion 13. The first electrode portion 13 contains a conductive carbon material. With this configuration, the first electrode portion 13 is provided with a fusing function. That is, when a short circuit occurs between the electrode layers 12 and an overcurrent flows in the laminated ceramic electronic component 100, the first electrode portion 13 is burned and cut by the overcurrent. With this, the first electrode portion 13 is opened and the overcurrent is blocked. As a result, the possibility of occurrence of fuming and firing in the laminated ceramic electronic component 100 can be lowered. In addition, even after the first electrode portion 13 is burned and cut, the other electrode layers 12 are maintained normally, and thus the function of the laminated ceramic electronic component 100 can be maintained.

Since the conductive carbon material decomposes, for example, at 300° C. to 600° C. in the atmosphere, the first electrode portion 13 containing the conductive carbon material can be burned and cut at a relatively low temperature. As a result, the temperature rise of the laminated ceramic electronic component 100 due to the overcurrent is suppressed, which lowers the possibility of occurrence of fuming and firing. In addition, damage to the laminated ceramic electronic component 100 due to the temperature rise can be reduced. Accordingly, even after the first electrode portion 13 is burned and cut, the function of the laminated ceramic electronic component 100 is likely to be maintained. When a conductive polymer, carbon black, carbon nanotube, carbon nanofiber, or graphite is used as the conductive carbon material, high conductivity may be obtained.

The location where the first electrode portion 13 is disposed in the electrode layer 12 is a location where the first electrode portion 13 functions as the fuse described above. That is, the location for disposing the first electrode portion 13 is determined in such a manner that the shorted circuit is insulated and the overcurrent is blocked by the first electrode portion 13 being burned and cut. The location for disposing the first electrode portion 13 in the electrode layer 12 is not limited to any specific one, as long as the location is determined in the manner described above. Accordingly, the first electrode portion 13 may be disposed to form an end portion of the electrode layer 12 or may be disposed to form an intermediate portion thereof. As illustrated in FIG. 1 and the like, the entirety of one electrode layer 12 may be constituted by the first electrode portion 13. The first electrode portion 13 may be directly connected to the external electrode 20.

The first electrode portion 13 may contain the conductive carbon material at a proportion of 20 vol % or greater, 40 vol % or greater, or 60 vol % or greater. With this configuration, a high conductivity of 10 S/cm or greater is obtained in the first electrode portion 13. In addition, with this configuration, an effective area of the conductive carbon material in the first electrode portion 13 is increased. Due to this, when the first electrode portion 13 is disposed in a capacitance region 16, the electrostatic capacitance of the laminated ceramic electronic component 100 may be improved. As illustrated in FIG. 2, the capacitance region 16 is a region where the electrode layers 12a and 12b adjacent to each other face each other, and electrostatic capacitance is generated in the laminated body 10.

The content ratio of the conductive carbon material required in order for the first electrode portion 13 to function as a fuse is not particularly defined. For example, when the conductive carbon material is contained at a proportion in a range from 20 vol % to 80 vol %, the function as a fuse is likely to be exhibited. In other words, when the first electrode portion 13 contains the conductive carbon material at a proportion in the range from 20 vol % to 80 vol %, the first electrode portion 13 is likely to be burned and cut by the overcurrent. Accordingly, it may be determined that the first electrode portion 13 containing the conductive carbon material at a proportion in the range from 20 vol % to 80 vol % has at least a fusing function.

In addition to the content described above, the fact that the first electrode portion 13 has a fusing function may be confirmed as follows. First, the laminated ceramic electronic component 100 is mounted on a wiring substrate, and a voltage higher than the rated voltage of the laminated ceramic electronic component 100 is applied thereto by a DC power supply. The applied voltage may be five times or more the rated voltage. Thereafter, the laminated body 10 is subjected to grinding treatment to expose a cross-section including the electrode layer 12, and the state around the first electrode portion 13 is visually checked. At this time, the first electrode portion 13 has been burned and cut due to a short circuit between the electrode layers 12. In a case where the shorted circuit is in an insulated state by the first electrode portion 13 being burned and cut, it may be determined that the first electrode portion 13 has a fusing function.

The first electrode portion 13 may contain a ceramic material in addition to the conductive carbon material. The typical first electrode portion 13 contains a conductive carbon material at a proportion of 20 vol % or greater and also contains a ceramic material as needed, and the void fraction is 30 vol % or less, but the present disclosure is not limited thereto.

When the first electrode portion 13 contains a ceramic material, shrink behavior of the first electrode portion 13 and shrink behavior of the ceramic layer 11 are close to each other at the time of firing, thereby making it possible to reduce cracks generated at the interface thereof. As a result, the generation of cracks during the firing process of the laminated ceramic electronic component 100 can be reduced. Accordingly, it is possible to reduce the generation of defects during the manufacturing process of the laminated ceramic electronic component 100.

The first electrode portion 13 may contain a ceramic material at a proportion of 30 vol % or greater, 50 vol % or greater, or 70 vol % or greater. With this configuration, the generation of defects during the manufacturing process of the laminated ceramic electronic component 100 may be further reduced.

Meanwhile, in a case where the first electrode portion 13 is disposed in the capacitance region 16, for example, the content ratio of the ceramic material in the first electrode portion 13 may be 30 vol % or less, 20 vol % or less, or 10 vol % or less. According to this configuration, an effective area of the conductive carbon material in the first electrode portion 13 is unlikely to decrease, and the electrostatic capacitance of the laminated ceramic electronic component 100 is unlikely to be lowered. Accordingly, it is possible to reduce the generation of defects during the manufacturing process of the laminated ceramic electronic component 100 while suppressing the drop of the electrostatic capacitance. As described above, the content ratios of the conductive carbon material and the ceramic material in the first electrode portion 13 may be set as appropriate in accordance with the purpose. The first electrode portion 13 may contain other constituents, such as a metal material, in addition to the constituents described above.

The main component of the ceramic material contained in the first electrode portion 13 may have the same composition as the main component of the ceramic layer 11. According to this configuration, the shrink behavior of the first electrode portion 13 and the shrink behavior of the ceramic layer 11 become closer to each other at the time of firing, thereby making it possible to further reduce cracks generated at the interface thereof. Accordingly, it is possible to further reduce the generation of defects during the manufacturing process of the laminated ceramic electronic component 100.

As illustrated in FIG. 2, the laminated ceramic electronic component 100 may be configured such that each of at least one set of electrode layers 12a and 12b laminated adjacent to each other has the first electrode portion 13. More specifically, the configuration may be such that at least one electrode layer 12a electrically connected to the first external electrode 20a and at least one electrode layer 12b laminated adjacent to the electrode layer 12a and electrically connected to the second external electrode 20b both have the first electrode layers 13.

According to this configuration, when a short circuit occurs between the electrode layer 12a and the electrode layer 12b, the first electrode portion 13 of at least one of the electrode layer 12a and the electrode layer 12b normally functions as a fuse, thereby blocking the overcurrent. As a result, the possibility of failure of the laminated ceramic electronic component 100 due to a defect of the fuse may be reduced. As illustrated in FIGS. 1 and 2, the laminated ceramic electronic component 100 may be configured such that the first electrode portion 13 is disposed in each of the electrode layers 12. With such configuration, the possibility of failure of the laminated ceramic electronic component 100 due to a defect of the fuse may be further reduced.

As illustrated in FIG. 3, in a laminated ceramic electronic component of the present disclosure, at least one electrode layer 12 having the first electrode portion 13 may further include a second electrode portion 14 containing a metal material. In other words, the at least one electrode layer 12 may have a configuration in which the first electrode portion 13 and the second electrode portion 14 containing the metal material are combined. The locations where the first electrode portion 13 and the second electrode portion 14 are disposed in the electrode layers 12 are not particularly limited as long as the first electrode portion 13 functions as a fuse.

The first electrode portion 13 containing the conductive carbon material has a higher equivalent series resistance (ESR) than the second electrode portion 14 containing the metal material, so that loss (heat generation) inside the laminated ceramic electronic component 100 is likely to be generated. As a result, the surrounding ceramic layer 11 may be damaged, so that the reliability of the laminated ceramic electronic component 100 may be degraded. Furthermore, for example, when the first electrode portion 13 containing the ceramic material at a proportion of 30 vol % or greater is disposed in the capacitance region 16, an effective area of the conductive carbon material in the first electrode portion 13 is low. Due to this, the electrostatic capacitance of the laminated ceramic electronic component 100 decreases in some case.

In contrast, when at least one electrode layer 12 having the first electrode portion 13 is configured to further include the second electrode portion 14 containing the metal material, the laminated ceramic electronic component 100 may be allowed to have a fusing function while maintaining the reliability and electrostatic capacitance of the laminated ceramic electronic component 100.

As illustrated in FIG. 3, the laminated ceramic electronic component 100 may be configured such that the first electrode portion 13 is disposed in an end margin region 15 and the second electrode portion 14 is disposed in the capacitance region 16 in at least one electrode layer 12.

The end margin region 15 refers to a region in which the electrode layers 12a electrically connected to the first external electrode 20a face each other without interposing the electrode layers 12b electrically connected to the second external electrode 20b. Alternatively, it refers to a region in which the electrode layers 12b electrically connected to the other external electrode 20b face each other without interposing the electrode layers 12a electrically connected to the first external electrode 20a. The capacitance region 16 refers to a region in which the adjacent electrode layers 12a and 12b face each other. The end margin region 15 is a region in which electrostatic capacitance is hardly generated in the laminated ceramic electronic component 100. Thus, by disposing the first electrode portion 13 in the end margin region, even in a case where the surrounding ceramic layer 11 is damaged due to the loss (heat generation) of the first electrode portion 13, the reduction in electrostatic capacitance of the laminated ceramic electronic component 100 may be suppressed.

The capacitance region 16 is a region in which electrostatic capacitance is generated in the laminated ceramic electronic component 100. Therefore, by disposing the second electrode portion 14 having a lower electric resistance than the first electrode portion 13 in the capacitance region 16, damage to the ceramic layer 11 present in the capacitance region 16 caused by the loss (heat generation) may be reduced. As a result, the reduction in electrostatic capacitance of the laminated ceramic electronic component 100 may be suppressed. Furthermore, as illustrated in FIG. 3, the first electrode portion 13 may be disposed only in the end margin region 15. According to such configuration, the reduction in electrostatic capacitance of the laminated ceramic electronic component 100 may be further suppressed.

The second electrode portion 14 may contain a ceramic material in addition to the metal material. The typical second electrode portion 14 contains the metal material at a proportion of 20 vol % or greater and also contains a ceramic material as needed, and the void fraction is 30 vol % or less, but the present disclosure is not limited thereto. When the second electrode portion 14 contains a ceramic material, the shrink behavior of the second electrode portion 14 and the shrink behavior of the ceramic layer 11 are close to each other at the time of firing, thereby making it possible to reduce cracks generated at the interface thereof. As a result, the generation of cracks during the firing process of the laminated ceramic electronic component 100 can be reduced. Accordingly, it is possible to reduce the generation of defects during the manufacturing process of the laminated ceramic electronic component 100.

The second electrode portion 14 may contain a ceramic material at a proportion of 30 vol % or greater, 50 vol % or greater, or 70 vol % or greater. With this configuration, the generation of defects during the manufacturing process of the laminated ceramic electronic component 100 may be further reduced.

Meanwhile, in a case where the second electrode portion 14 is disposed in the capacitance region 16, for example, the content ratio of the ceramic material in the second electrode portion 14 may be 30 vol % or less. According to this configuration, an effective area of the metal material in the second electrode portion 14 is unlikely to decrease, and the electrostatic capacitance of the laminated ceramic electronic component 100 is unlikely to be lowered. Accordingly, it is possible to reduce the generation of defects during the manufacturing process of the laminated ceramic electronic component 100 while suppressing the drop of the electrostatic capacitance of the laminated ceramic electronic component 100. As described above, the content ratios of the metal material and the ceramic material in the second electrode portion 14 may be set as appropriate in accordance with the purpose. The second electrode portion 14 may contain other constituents, such as a conductive carbon material, in addition to the constituents described above.

The composition of the electrode layer 12 (the first electrode portion 13, the second electrode portion 14) may be analyzed as follows. First, the laminated body 10 is subjected to grinding treatment to expose a cross-section including the electrode layer 12. Subsequently, a backscattered electron image (BEI) is image-captured using a scanning electron microscope (SEM) with respect to the exposed cross-section and an area ratio (area %) of the conductive carbon material or ceramic material occupying the electrode layer 12 is measured using an image analysis device. At this time, ten or more locations are selected for the image-capturing, and the average value thereof is calculated. The area proportion (area %) determined in this manner may be considered as the volume proportion (vol %).

Next, a specific example of a manufacturing method for the laminated ceramic electronic component 100 according to the embodiment will be described.

First, a paste for the ceramic layer 11 is produced. The paste for the ceramic layer 11 described below is suitable for co-firing the paste for the ceramic layer 11 and a paste for the first electrode portion 13 to be described later. However, the paste for the ceramic layer 11 used in the laminate ceramic electronic component 100 according to the embodiment is not limited to the paste described below.

First, a powder of perovskite oxide represented by a general formula $ABO_3$ is prepared. Examples of perovskite oxide include, but are not limited to, barium titanate ($BaTiO_3$), calcium zirconate ($CaZrO_3$), calcium titanate ($CaTiO_3$), and strontium titanate ($SrTiO_3$). Nanopowder having an average particle diameter of about 50 nm is used as the powder of the perovskite oxide. Commercially available powder may be used as such powder. The average particle diameter of the powder can be measured from a scanning electron microscope (SEM) image by using image analysis software.

Subsequently, a powder of hydroxide $A(OH)_2$ of an A-site element and a powder of oxide $BO_2$ of a B-site element are further prepared with respect to the general formula $ABO_3$ of the prepared perovskite oxide. Commercially available powder may be used as the powder of hydroxide $A(OH)_2$ of the A-site element and the powder of oxide $BO_2$ of the B-site element. The average particle diameter of the powder of hydroxide $A(OH)_2$ of the A-site element and the powder of oxide $BO_2$ of the B-site element may be equivalent to that of the powder of the perovskite oxide prepared in advance (approximately 50 nm).

Thereafter, a hydroxide $A(OH)_2$ aqueous solution of the A-site element of 0.1 mol/L is mixed with the powder of oxide $BO_2$ of the B-site element at a molar ratio of 1:1 to produce a suspension of $A(OH)_2/BO_2$.

Subsequently, the $A(OH)_2/BO_2$ suspension is mixed with the previously prepared powder of perovskite oxide at a proportion of 1:4 in mass ratio to produce ceramic pellets. A high shear mixer may be used for the mixing. The high shear mixer refers to a mixer that includes a rotor and a stator, and exhibits a high shear action by rotating the rotor in a state in which a precise clearance is provided between the rotor capable of high-speed rotation and the stator being fixed. The mixing time is not particularly limited. The ceramic pellets may be added with other materials such as Si, Mg, and rare earth elements, in addition to the materials described above.

Subsequently, a water-based vehicle in which a water-soluble binder, a dispersant, or the like is dissolved in water is kneaded into the produced ceramic pellets to achieve a paint material, whereby the paste for the ceramic layer 11 is obtained. The water-soluble binder used in the water-based vehicle is not particularly limited, and examples thereof include polyvinyl alcohol, cellulose, and water-soluble acrylic resin.

Next, a paste for the electrode layer 12 is produced. The paste for the electrode layer 12 includes a paste for the first electrode portion 13 and, as necessary, a paste for the second electrode portion 14. The paste for the first electrode portion 13 is produced by kneading a conductive carbon material such as a conductive polymer, carbon black, carbon nanotube, carbon nanofiber or graphite, and an organic vehicle.

The organic vehicle is a vehicle in which a binder is dissolved in an organic solvent. The binder used in the organic vehicle is not particularly limited, and may be appropriately selected from various types of typical binders such as ethyl cellulose and polyvinyl butyral. The organic solvent used is also not particularly limited, and may be appropriately selected from various types of organic solvents such as terpineol, butyl carbitol, acetone, and toluene, depending on the methods utilized such as a printing method and a sheet method.

The paste for the second electrode portion 14 is produced by kneading the organic vehicle and a base metal such as nickel (Ni), copper (Cu) or tin (Sn), a noble metal such as platinum (Pt), palladium (Pd), silver (Ag) or gold (Au), or an alloy including these metals. A ceramic material may be added to the paste for the first electrode portion 13 and the paste for the second electrode portion 14 as necessary.

Next, a green chip becoming the laminated body 10 after firing is produced. A ceramic green sheet is produced using a molding method, such as a doctor blade method or a die coating method, with respect to the paste for the ceramic layer 11. The green sheet having the electrode layer 12 is produced by performing printing with the paste for the first electrode portion 13 on the green sheet surface in a predetermined pattern by screen printing, gravure printing, or the like. In a case where the electrode layer 12 having the second electrode portion 14, in addition to the first electrode portion 13, is produced, the paste for the first electrode portion 13 or the paste for the second electrode portion 14 may be applied on the ceramic green sheet surface by printing, and then the remaining paste may be further applied by printing with ink-jet printing or the like. Subsequently, a green laminated body is made by laminating a plurality of the green sheets each having the electrode layer 12 and pressure-bonding them, and the green chip is obtained by cutting the green laminate body to a predetermined size.

Next, the green chip is subjected to firing. At this time, the temperature elevation rate is 5° C./minute to 10° C./minute, the firing temperature is 150° C. to 250° C., and the temperature holding time is 0.5 hours to 4 hours. The firing atmosphere may be in the air. After the firing, dehydration treatment is performed in the air under the conditions of the holding temperature being 150 to 200° C. and the holding time being 6 to 12 hours. The firing may be performed under a pressure from approximately 100 to 500 MPa in the firing treatment. According to this method, the density of the ceramic layer 11 after the firing is enhanced. Examples of the pressurizing method include, but are not limited to, hot isostatic pressing (HIP).

Annealing treatment may be performed as necessary after the firing of the green chip. The conditions under which the annealing treatment is performed may be such that the temperature elevation rate is 5° C./minute to 10° C./minute, the treatment temperature is 700° C. to 900° C., and the temperature holding time is 0.5 hours to 3 hours. A mixed gas of $N_2$ and $H_2$, for example, may be humidified and used as an atmosphere gas.

The ceramic layer 11 obtained as described above has a density of 90% or greater relative to the theoretical density and is applicable to the laminated ceramic electronic component 100.

Meanwhile, for example, when the firing temperature of the green chip is 1000° C. or higher, the first electrode portion 13 containing the conductive carbon material may be burned out during the firing process. Therefore, in the production of the laminated ceramic electronic component 100 of the present embodiment, the firing temperature of the green chip needs to be 1000° C. or less. As described above, when the firing temperature of the green chip is 250° C. or less, the first electrode portion 13 having higher reliability can be obtained.

Next, end surface polishing is performed on the obtained laminated body 10 by barrel polishing, for example, and the paste for the external electrode 20 is applied and heated at 700 to 900° C. for approximately 0.1 to 1 hour, thereby forming the external electrode 20. A coating layer is formed on the surface of the external electrode 20 as needed by plating or the like. The paste for the external electrode 20 may be produced in the same manner as the paste for the second electrode portion 14 described above. The laminated ceramic electronic component 100 according to the embodiment manufactured as described above is mounted on a wiring substrate or the like by soldering or the like, and is used in various electronic devices and the like.

The embodiment of the present disclosure has been described thus far. Note that, however, the laminated ceramic electronic component according to the present disclosure is not limited to the above-described embodiment in any way, and various modifications may be made thereon within a range that does not depart from the spirit of the laminated ceramic electronic component according to the present disclosure.

EXAMPLES

Hereinafter, the laminated ceramic electronic component according to the present disclosure will be described based on more detailed examples, but the laminated ceramic electronic component according to the present disclosure is not limited to the examples below.

First, laminated ceramic electronic components of specimen No. 1 to specimen No. 5 were produced. A powder of barium titanate ($BaTiO_3$) having an average particle diameter of 50 nm was prepared first. Thereafter, a $Ba(OH)_2$ aqueous solution of 0.1 mol/L was mixed with a powder of $TiO_2$ at a molar ratio of 1:1 to produce a suspension of $Ba(OH)_2/TiO_2$.

Subsequently, the $Ba(OH)_2/TiO_2$ suspension was mixed with the previously prepared barium titanate ($BaTiO_3$) powder at a proportion of 1:4 in mass ratio to produce ceramic pellets. A high shear mixer was used for the mixing and the mixing time was five hours. Then, the obtained ceramic pellets were added with a water-based vehicle and mixed to a paste state by ball milling to obtain the paste for the ceramic layer.

Subsequently, barium titanate ($BaTiO_3$), ethyl cellulose, and benzotriazole were added to carbon nanotubes. After the addition, the obtained mixture was kneaded to a paste state by using three rolls, whereby the paste for the first electrode portion was produced.

Subsequently, barium titanate ($BaTiO_3$), terpineol, ethyl cellulose, and benzotriazole were added to Ni particles. After the addition, the obtained mixture was kneaded to a paste state by using three rolls, whereby the paste for the second electrode portion was produced.

Using the produced ceramic layer paste, a green sheet was formed on a PET film in such a manner that the thickness became 15 μm after being dried. Subsequently, the electrode layer was formed thereon by printing in a predetermined pattern using the paste for the first electrode portion and the paste for the second electrode portion. Thereafter, the sheet was peeled from the PET film, and the green sheet having the electrode layer was produced. Subsequently, a plurality of the green sheets each having the electrode layer were laminated and pressure-bonded, whereby a green laminate body was obtained. The green laminate body was cut to a predetermined size to obtain a green chip.

Thereafter, firing was performed on the obtained green chip under such conditions that the temperature elevation rate was 9° C./minute, the firing temperature was 180° C., and the temperature holding time was three hours. The firing atmosphere was in the air. After the firing, dehydration treatment and binder removal treatment were performed in the air under the conditions of the holding temperature being 200° C. and the holding time being 12 hours to obtain a sintered body that becomes a laminated body. The firing was performed under a pressure of 300 MPa by hot isostatic pressing (HIP).

The obtained sintered body was then subjected to barrel polishing treatment, and the electrode layer was fully exposed to an end surface of the laminated body. Ni external electrodes were formed as the external electrodes, and the laminated ceramic electronic components of specimen No. 1 to specimen No. 5 were obtained. The size of each of the obtained specimens was 3.2 mm×1.6 mm×0.6 mm, where the thickness of the ceramic layer was 10 μm, the thickness of the electrode layer was 1.0 μm, and the number of ceramic layers each sandwiched between the electrode layers was 50.

In the laminated ceramic electronic components of specimen No. 1 to specimen No. 5, the configurations of the electrode layers were different from each other, and the details thereof will be described below. Although each of the specimens included a plurality of electrode layers, the configurations of the plurality of electrode layers included in one type of specimen were all made to be the same.

Specimen No. 1 is such that the entire electrode layer is constituted by the first electrode portion. In the first electrode portion, the content ratio of carbon nanotubes is approximately 20 vol %, the content ratio of barium titanate ($BaTiO_3$) is approximately 70 vol %, and the void fraction is approximately 10 vol %.

Specimen No. 2 is such that the entire electrode layer is constituted by the first electrode portion. In the first electrode portion, the content ratio of carbon nanotubes is approximately 40 vol %, the content ratio of barium titanate (BaTiO$_3$) is approximately 50 vol %, and the void fraction is approximately 10 vol %.

Specimen No. 3 is such that the entire electrode layer is constituted by the first electrode portion. In the first electrode portion, the content ratio of carbon nanotubes is approximately 60 vol %, the content ratio of barium titanate (BaTiO$_3$) is approximately 30 vol %, and the void fraction is approximately 10 vol %.

Specimen No. 4 is such that the entire electrode layer is constituted by the first electrode portion. In the first electrode portion, the content ratio of carbon nanotubes is approximately 80 vol %, the content ratio of barium titanate (BaTiO$_3$) is approximately 10 vol %, and the void fraction is approximately 10 vol %.

Specimen No. 5 is such that the electrode layer includes two electrode portions, that is, the first electrode portion and the second electrode portion. The first electrode portion is disposed only in the end margin region of the laminated body, and is alternately connected to the first external electrode and the second external electrode. The average lengths of the first electrode portion and the second electrode portion are at a ratio of approximately 9:1, and the average widths and the average thicknesses thereof are substantially the same. In the first electrode portion, the content ratio of carbon nanotubes is approximately 40 vol %, the content ratio of barium titanate (BaTiO$_3$) is approximately 50 vol %, and the void fraction is approximately 10 vol %. In the second electrode portion, the content ratio of nickel (Ni) is approximately 80 vol %, the content ratio of barium titanate (BaTiO$_3$) is approximately 10 vol %, and the void fraction is approximately 10 vol %.

Next, the laminated ceramic electronic component of specimen No. 6, which includes only the electrode layer containing nickel (Ni) as a main component thereof and not containing a conductive carbon material, was produced by the manufacturing method described above. A difference between this laminated ceramic electronic component of specimen No. 6 and the laminated ceramic electronic components of specimen No. 1 to specimen No. 5 is only a configuration of the electrode layer. In the electrode layer included in specimen No. 6, the content ratio of nickel (Ni) was approximately 80 vol %, the content ratio of barium titanate (BaTiO$_3$) was approximately 10 vol %, and the void fraction was approximately 10 vol %.

The laminated ceramic electronic components of specimen No. 1 to specimen No. 6 produced were evaluated as described below. The number of samples was 30 for each specimen.

First, electrostatic capacitance of each specimen was measured at room temperature (25° C.) using a constant-temperature bath and an LCR meter. At this time, measurement was performed with the frequency being 1.0 kHz and the measurement voltage being 1 Vrms, and the average value thereof was determined. The electrostatic capacitance of the laminated ceramic electronic component of specimen No. 6 was taken as a reference value (1.00), and the electrostatic capacitance of each of the laminated ceramic electronic components of specimen No. 1 to specimen No. 5 was converted to a value relative to the reference value.

Subsequently, after mounting each specimen on a glass epoxy substrate with LF solder, the wiring substrate was bent for five seconds with a fixed amount of deflection (5 mm). Thereafter, the rated voltage was applied to each specimen in a high-temperature and high-humidity bath in which the temperature was 125° C., the relative humidity was 95% RH, and the air pressure was 1.2 atm, and a 1000-hour moisture resistance load acceleration test was performed. After the test was completed, the number of samples in a short circuit state was counted in each specimen. In this case, the sample in which an insulation resistance value (IR value) dropped by two or more orders of magnitude was determined as being in a short circuit state. When the first electrode portion functions normally as a fuse, after the short circuit occurs once between the electrode layers, the first electrode portion is burned and cut to block the overcurrent. On the other hand, when the first electrode portion does not function as a fuse, after the short circuit occurs between the electrode layers, the insulation is not restored and the short circuit state is maintained.

Thereafter, the number of samples in which the fuses (first electrode portions) were burned and cut was further counted in specimen No. 1 to specimen No. 5. At the time of counting, grinding treatment was performed on specimen No. 1 to specimen No. 5 to expose a cross-section including the electrode layer, and then the state of the fuse was visually checked. The sample in which at least one fuse was burned and cut was counted as a sample in which the fuse was burned and cut. The results of the above-discussed test are shown in Table 1.

TABLE 1

| Sample No. | Electrostatic capacitance | Number of samples in short circuit state (number) | Number of samples in which fuses were burned and cut (number) |
|---|---|---|---|
| 1 | 0.81 | 0/30 | 14/30 |
| 2 | 0.85 | 0/30 | 16/30 |
| 3 | 0.88 | 0/30 | 16/30 |
| 4 | 0.76 | 0/30 | 21/30 |
| 5 | 1.00 | 0/30 | 20/30 |
| 6 | 1.00 | 21/30 | |

As shown in Table 1, in each of specimen No. 1 to specimen No. 5, the electrode layer includes the first electrode portion, and no sample in a short circuit state was found. In each of specimen No. 1 to specimen No. 5, the first electrode portion contained approximately 20 vol % or greater of carbon nanotubes. Further, in each of specimen No. 1 to specimen No. 5, the main component of the ceramic layer and the ceramic material contained in the first electrode portion had the same composition (BaTiO$_3$).

In each of specimen No. 1, specimen No. 2, specimen No. 3, and specimen No. 5, the first electrode portion contained approximately 30 vol % or greater of barium titanate (BaTiO$_3$), and the number of samples in which the fuses were burned and cut was 20 or less. Meanwhile, in specimen No. 4, in which the first electrode portion contained approximately 10 vol % of barium titanate (BaTiO$_3$), the number of samples in which the fuses were burned and cut was 21. In specimen No. 6, in which no fuse was provided and the electrode layer contained approximately 10 vol % of barium titanate (BaTiO$_3$), the number of samples in a short circuit state was found to be 21. In view of these, it is understood that, when the first electrode portion contains approximately 30 vol % or more of barium titanate (BaTiO$_3$), a short circuit is unlikely to occur in the laminated ceramic electronic component.

From specimen No. 1 to specimen No. 3, it is understood that, as the content ratio of carbon nanotubes in the first electrode portion increases, the electrostatic capacitance of the laminated ceramic electronic component increases. On the other hand, in specimen No. 4, in which the highest content ratio of carbon nanotubes was 80 vol %, the electrostatic capacitance was lower in comparison with specimen No. 1 to specimen No. 3. The reason for this may be as follows: since the content ratio of barium titanate ($BaTiO_3$) in the first electrode portion of specimen No. 4 was lower than that of specimen No. 1 to specimen No. 3, a defect may have been generated during the firing process of part of the electrode layers.

In specimen No. 5, in which the first electrode portion was disposed only in the end margin region, the electrostatic capacitance did not substantially drop in comparison with specimen No. 6, which included only the electrode layer containing nickel (Ni) as the main component thereof and not containing the conductive carbon material.

REFERENCE SIGNS LIST

100 Laminated ceramic electronic component
10 Laminated body
11 Ceramic layer
12 Electrode layer
13 First electrode portion
14 Second electrode portion
15 End margin region
16 Capacitance region
20 External electrode (First external electrode and second external electrode)

The invention claimed is:

1. A laminated ceramic electronic component comprising:
a laminated body in which ceramic layers and electrode layers are alternately laminated,
wherein at least one of the electrode layers includes a first electrode portion containing 20 vol % or more of a conductive carbon material.

2. The laminated ceramic electronic component according to claim 1,
wherein the first electrode portion contains a ceramic material.

3. The laminated ceramic electronic component according to claim 2,
wherein the first electrode portion contains 30 vol % or greater of the ceramic material.

4. The laminated ceramic electronic component according to claim 2,
wherein a main component of the ceramic layer and the ceramic material have the same composition.

5. The laminated ceramic electronic component according to claim 1,
wherein each of at least one set of the electrode layers laminated adjacent to each other includes the first electrode portion.

6. The laminated ceramic electronic component according to claim 1,
wherein the electrode layer including the first electrode portion further includes a second electrode portion containing a metal material.

7. The laminated ceramic electronic component according to claim 6, further comprising:
a first external electrode and a second external electrode to which the electrode layers are electrically connected alternately, at end portions of the laminated body,
wherein the laminated body includes
an end margin region in which the electrode layers electrically connected to the first external electrode face each other without interposing the electrode layers electrically connected to the second external electrode and
a capacitance region in which the electrode layers electrically connected to the external electrodes that are different face each other, and
in at least one of the electrode layers, the first electrode portion is present in the end margin region and the second electrode portion is present in the capacitance region.

8. The laminated ceramic electronic component according to claim 7,
wherein, in at least one of the electrode layers, the first electrode portion is present only in the end margin region.

9. The laminated ceramic electronic component according to claim 1,
wherein the conductive carbon material is a conductive polymer, carbon black, carbon nanotube, carbon nanofiber, or graphite.

* * * * *